Nov. 24, 1942.     J. KALIX     2,302,695
VALVE
Filed March 3, 1942     3 Sheets-Sheet 1
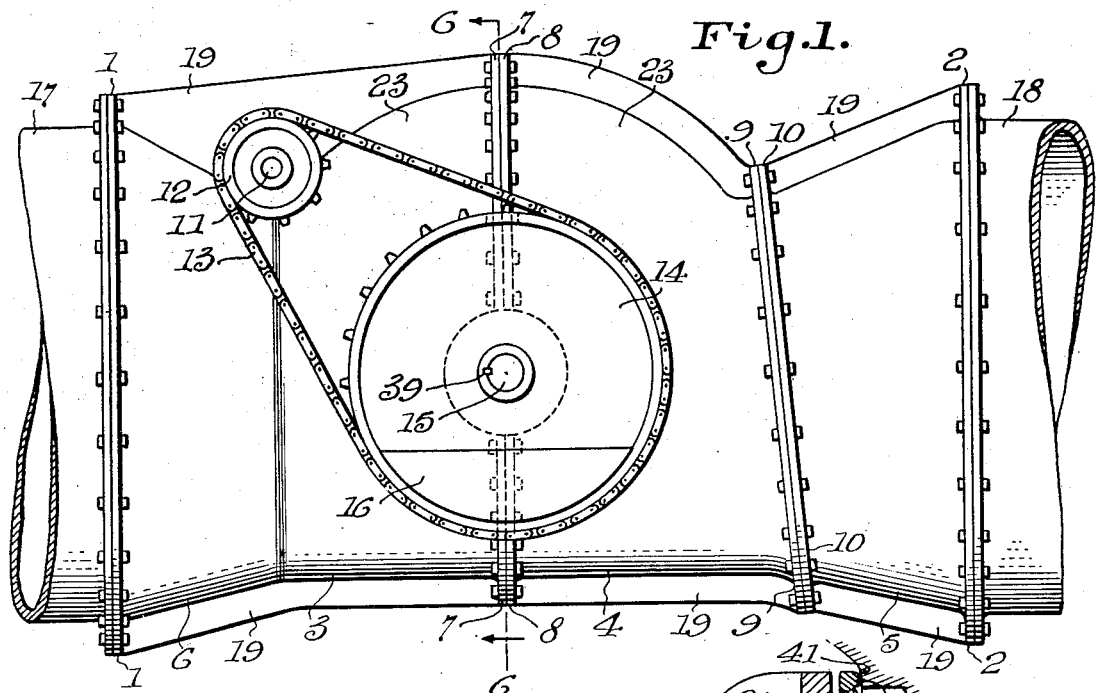
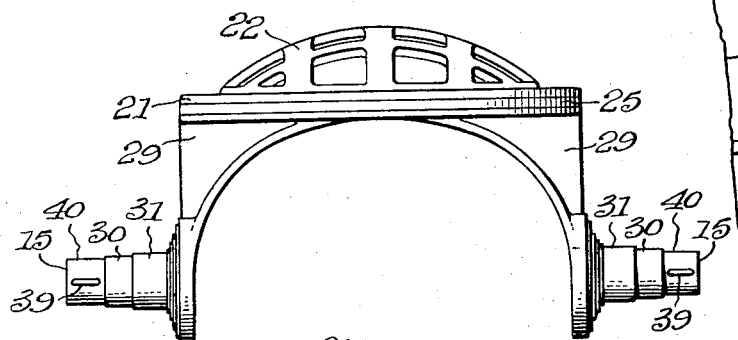
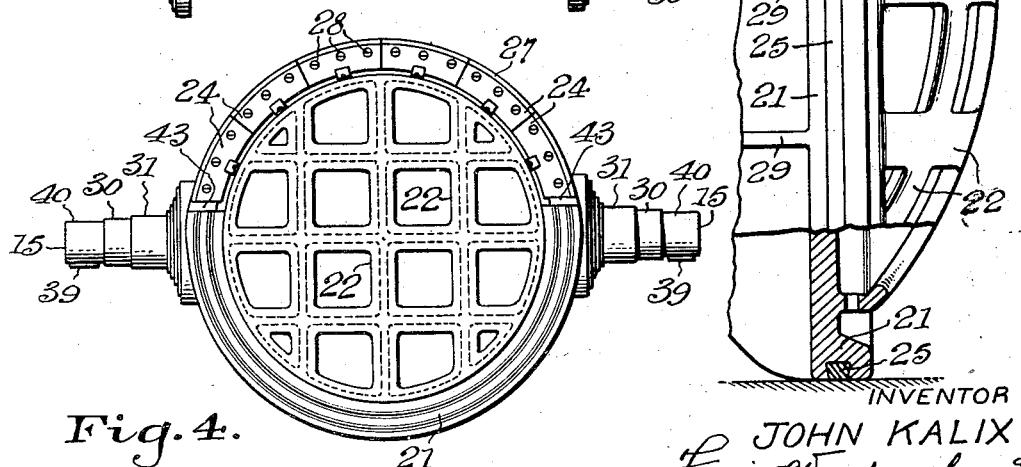
INVENTOR
JOHN KALIX
BY
ATTORNEYS Nov. 24, 1942.  J. KALIX  2,302,695
VALVE
Filed March 3, 1942  3 Sheets-Sheet 2
Fig. 2.
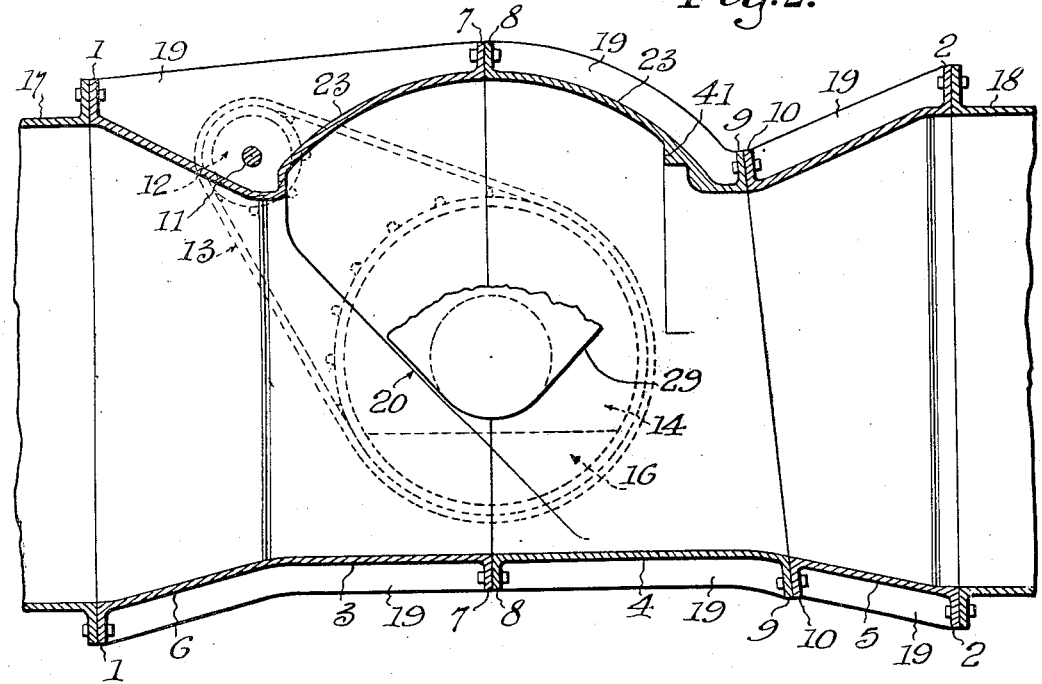
Fig. 6.
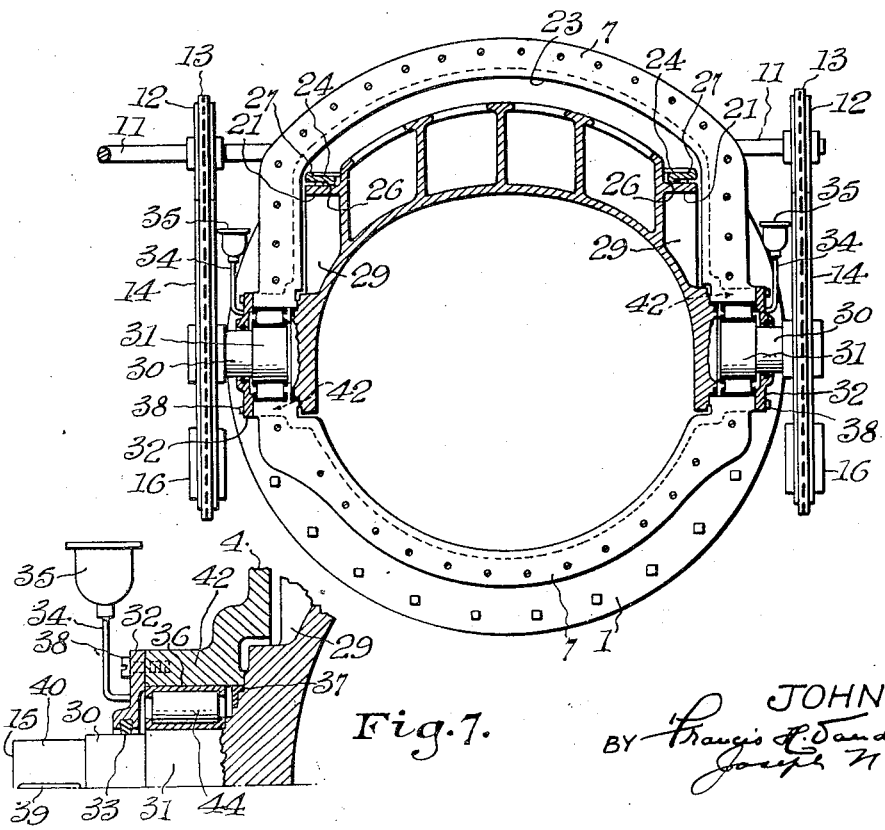
Fig. 7.
INVENTOR
JOHN KALIX
BY
ATTORNEYS Nov. 24, 1942.    J. KALIX    2,302,695
VALVE
Filed March 3, 1942    3 Sheets-Sheet 3

INVENTOR
JOHN KALIX
ATTORNEYS

Patented Nov. 24, 1942

2,302,695

UNITED STATES PATENT OFFICE 2,302,695

VALVE

John Kalix, Nashville, Tenn.

Application March 3, 1942, Serial No. 433,137
8 Claims. (Cl. 251—18)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improvement in valves and particularly to a valve of the type designed for use with power dam installations.

It is an object of this invention to provide a valve of improved construction which will greatly lessen the disturbances in the valve caused by vacuum and pressure during flow while the gate is in motion or in an intermediate stop position.

Another object of this invention is to make use of a valve having a funnel type discharge whereby the higher velocity under the gate than at the intake of the valve and the smooth bottom of the casing will carry sludge or floating matter through the valve without plugging it.

Still another object of my invention is the provision of a valve having an improved sealing means whereby a lighter gate is possible and yet positive sealing without friction is assured.

Other objects of this invention are to provide a valve in which the gate is mounted on roller bearings which take the full pressure of the closed gate; to provide a valve gate which is counterbalanced in all positions; and to provide a valve which is of extremely small external dimensions which is easily installed and replaced, reliable and simple in construction and inexpensive to construct and maintain.

These and other objects of my invention will be apparent upon a consideration of the following detailed description when taken in conjunction with the accompanying drawings, in which:

Fig. 1 is a side elevation of a valve embodying the principles of the invention;

Fig. 2 is a longitudinal cross-section of the valve with the gate removed;

Fig. 3 is an end elevation of the gate;

Fig. 4 is a top elevation of the gate;

Fig. 5 is an enlarged side elevation of the gate, partly in cross-section;

Fig. 6 is an end view in cross-section along the line 6—6 of Fig. 1;

Fig. 7 is an enlarged detailed view of the watertight bearing;

Figure 9:
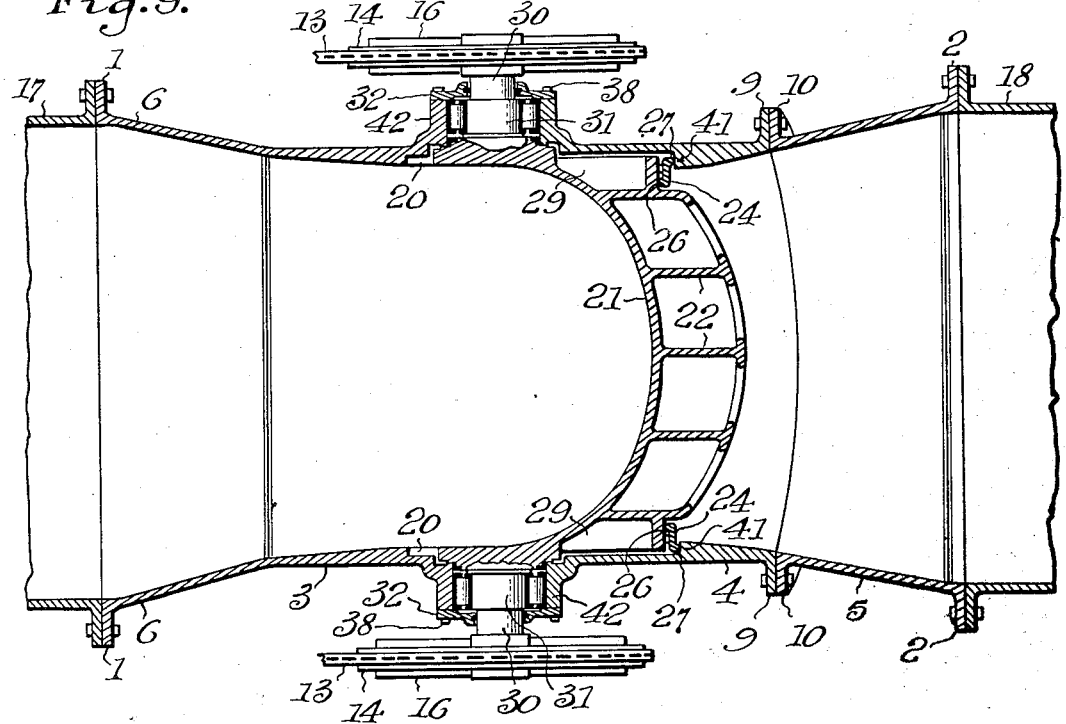
Fig. 9 is a cross-sectional view along the line 9—9 of Fig. 8.

Referring to Figs. 1 and 2, it will be seen that my improved valve is constructed in three sections; an inlet section 3, a seal section 4, and an outlet section 5. The inlet section 3 is provided with a flared portion 6 having a flange 1 by means of which it may be attached to the inlet pipe 17. The opposite end of the inlet section 3 carries a flange 7 arranged to be bolted to a similar flange 8 carried by the seal section 4. The upper portions of the inlet and seal sections are shaped to form a hemispherical dome 23. The seal section 4 is provided with the flange 9 by means of which it may be attached to the flange 10 carried by the outlet portion 5. The outlet section 5 consists of a flaring member and carries at its outlet end a flange 2 arranged to attach the section to the outlet pipe 18. Strengthening ribs 19 may be provided if desired.

The following means are provided for operating the valve. A drive shaft 11 has keyed to it the spur wheel 12 which drives a chain 13 arranged to operate the spur wheel 14. The spur wheel 14 is keyed to the trunnion 15 of the gate and is provided with a weighted portion 16 which acts to counterbalance the weight of the gate. The drive shaft 11 may be hand or power operated and extends across the valve and operates a similar system attached to the other gate trunnion. It will be seen that such an arrangement provides a simple system whereby positive action of the gate may be easily and accurately controlled.

Referring more particularly to Fig. 2, it will be seen that the inner side of the valve is provided with a gate stop 20 arranged to limit the rotation of the gate in its extreme positions. There is also provided, in the dome 23, an abutting shelf 41 arranged to contact the upper gate seal 24. The inlet and seal sections are arranged to form a bearing support 42 for the trunnions 15 of the gate.

The construction of my improved gate will be clear from a consideration of Figs. 3, 4 and 5. The trunnions 15 are constructed to have a drive wheel carrying portion 40 which has a keyway 39, a seal portion 30 of somewhat larger diameter, and a main bearing portion 31 of still larger diameter. The main supporting spokes 29 are shaped to have a circular top and circular cross-section. To the top is fastened a circular disc-shaped seal carrying member 21. So that the disc 21 may be of light weight construction and still offer the maximum rigidity, it carries the ribbed dome 22 of substantially hemispherical shape. The seal carrying member 21 is shaped on its lower half to conform with the inner diameter of the seal section 4 and carries a babbitt seal 25. This seal section 25 is constructed so as to extend over slightly more than half of the circumference of the disc 21. The remaining portion of the disc carries the abutting seal members 24. The seal members 24 are mounted on bearing posts 28 and have oppositely extending portions 26 and 27. The portion 26 is arranged to contact the disc 21 and the portion 27 the abutting shelf 41. The principle of operation of the seals 24 is such that the fluid pressure acting on the portions of the seal is balanced about the bearing posts 28. The contact points on the oppositely extended portions 26 and 27 are arranged to be equidistant from the bearing posts. The springs placed at intervals exert a gentle contacting pressure. Thus when opening or closing the gate substantially no seal friction exists and no additional operating capacity is required.

The method of mounting the gate in the valve will be clear upon a consideration of Figs. 6 and 7. The bearing portion 31 of the trunnions 15 are placed in the bearing supports 42. The dome 23 admits the ribbed dome 22; the spokes 29, together with the valve sides, form a substantially circular conduit for the flow of fluid which is substantially free from obstructions which would cause turbulence, chattering, or otherwise interfere with the passage of the fluid. The weight of the gate is substantially balanced by the counterweights 16 and the full weight of the gate is carried by the bearings.

In order to provide a fluid-tight bearing, I prefer to use the construction shown in detail in Fig. 7. Roller bearings 44 carried in bearing cups 36 separate the bearing support 42 in the valve sections 3 and 4. The valve sections 3 and 4 carry a seal ring 32 attached by means of fasteners 38 and which has a babbitt seal 33 arranged to fit snugly against the seal portion 30 of the trunnion 15. The gate carries a babbitt seal ring 37 arranged to fit snugly against the bearing support 42. An oil reservoir 35 is arranged to lubricate the bearing by means of supply pipe 34. It will be seen that the seal 37 prevents the egress of the fluid within the valve while it also, in conjunction with the seal 33, prevents the escape of the lubricating oil.

Figure 8:
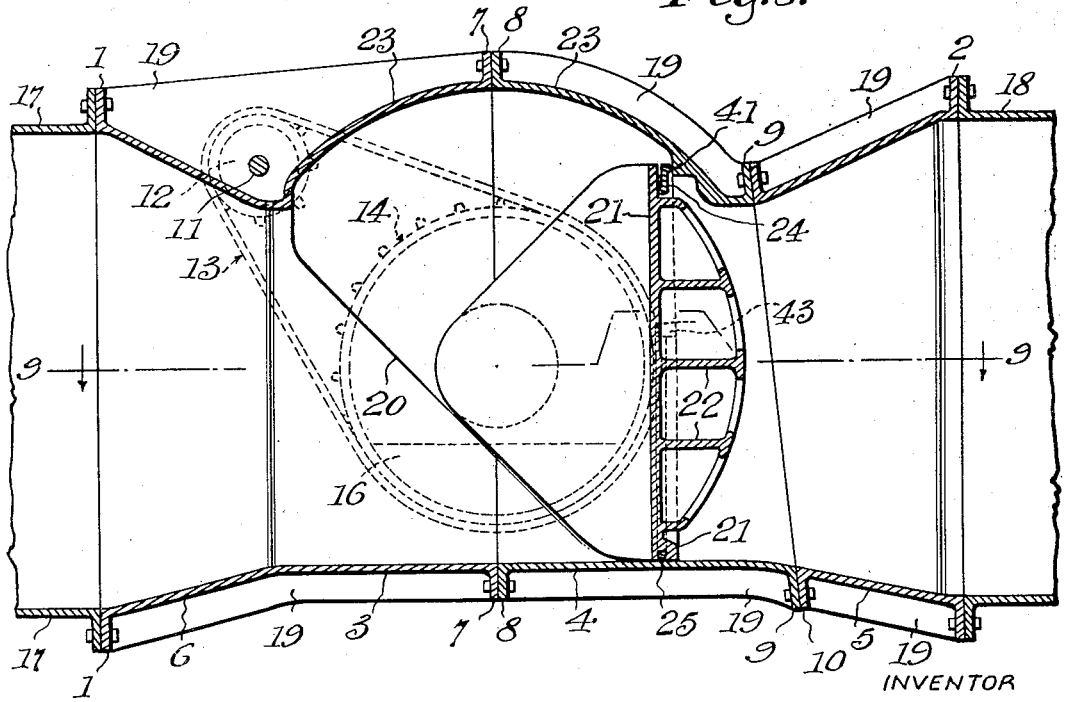
Fig. 8 is a longitudinal cross-sectional view of the valve with the gate in its closed position.

The sealing operation of my improved valve will be clear upon a consideration of Figs. 8 and 9.

As the gate is lowered, the babbitt seal 25 gradually approaches the under side of the valve until contact is made and the seal effected. It will be seen that there is no seal friction here since there is no contact until the gate is fully closed. Similarly the upper gate seal gradually approaches the abutting shelf 41 until at the moment of contact sealing is effected. Here, too, there is no sealing friction since there is no contact until the gate is closed. The packing 43 acts as a seal between the upper seal 24 and the lower seal 25 to insure that there will be no leakage between these members. It will be seen that since the lower seal 25 extends past the center of the valve, and the upper seal 24 is forward of it with respect to the axis of rotation of the gate, a lever arm tending to rotate the gate in the direction of closing will be set up and aid in the complete sealing of the gate opening. Since there is substantially no sealing friction, and the gate is counterbalanced, this lever arm is all the force which must be overcome while opening the gate, permitting a gate operator of minimum power to be used.

The construction of the valve is such that the cross-sectional area is substantially twenty-five percent less than the valve inlet or outlet area giving rise to a Venturi action. This action results in a lesser friction head loss than the same length of pipe of full area. It will be noted that equal angular turns of the drive shaft 11, in closing, will result in non-proportional diminution of the gate area. That is, the entire traverse of the gate from full open to full close is 90°. When approaching full close position, the movement of the gate one degree will result in a diminution of area of less than one-ninetieth of the total area. This has the advantage of providing a gradual stoppage of the fluid with a constant angular velocity of the drive shaft.

While I have described my invention with reference to a single embodiment thereof, it is to be understood that I do not wish to be limited to the particular details and assemblies described, since obvious modifications within the spirit of the invention will suggest themselves to one skilled in the art.

Having described my invention, what I claim as new and wish to secure by Letters Patent is:

1. A valve comprising a tubular body member, a gate, means to rotate said gate from a position perpendicular to the axis of said body member to a position parallel to said axis and remote therefrom, a seal mounted on the face of said gate arranged to contact a ledge extending over a portion of the inner surface of said body member, and a seal extending over a portion of the edge of said gate arranged to contact the inner surface of said body member.

2. A valve comprising a tubular body member, a gate, means to rotate said gate from a position perpendicular to the axis of said body member to a position parallel to said axis and remote therefrom, a substantially semicircular ledge in said body member arranged to be contacted by a seal mounted on the face of said gate, and a substantially semicircular seal on the edge of said gate, said edge seal being arranged to contact the inner surface of said body member.

3. A valve comprising a tubular body member, a gate, said gate having a substantially semicircular edge seal and a substantially semicircular face seal, said seals together extending over substantially the entire periphery of said gate, a ledge in said body member arranged to be contacted by said face seal, said edge seal being arranged to contact the inner surface of said body member, means carried by said gate for completing the seal between said ledge and said contacted inner surface, and means for rotating said gate from a position perpendicular to the axis of said body member to a position parallel to said axis and remote therefrom.

4. A valve gate comprising a seal carrying member, a seal arranged along a portion of the edge of said member, and a seal arranged along a portion of the face of said member, said seals being arranged so that together they extend over substantially the entire perimeter of said member.

5. A valve gate according to claim 4 in which said seal carrying member is substantially circular.

6. A valve gate according to claim 4 in which said edge seal extends over more than half of said perimeter.

7. A valve comprising a tubular body member, a gate, means to rotate said gate from a position perpendicular to the axis of said body member to a position parallel to said axis and remote therefrom, and a seal extending over a portion of the edge of said gate and arranged to contact the inner surface of said body member.

8. A valve comprising a tubular body member, a gate, means to rotate said gate from a position perpendicular to the axis of said body member to a position parallel to said axis and remote therefrom, and a substantially semicircular seal mounted on the edge of said gate, and arranged to contact the inner surface of said body member.

JOHN KALIX.